United States Patent [19]
Rhee et al.

[11] Patent Number: 5,372,222
[45] Date of Patent: Dec. 13, 1994

[54] LIGHTWEIGHT AND HIGH THERMAL CONDUCTIVITY BRAKE ROTOR

[75] Inventors: Seong K. Rhee, Northville; Thomas A. Libsch, Novi, both of Mich.

[73] Assignee: AlliedSignal Inc., Morristown, N.J.

[21] Appl. No.: 894,876

[22] Filed: Jun. 8, 1992

[51] Int. Cl.$^5$ .............................................. F16D 65/12
[52] U.S. Cl. .............................. 188/218 XL; 188/73.1
[58] Field of Search ........ 188/218 R, 218 XL, 251 R, 188/251 A, 251 M, 264 A, 264 AA; 192/107 M; 428/614, 570

[56] References Cited

U.S. PATENT DOCUMENTS

| | | | |
|---|---|---|---|
| 2,938,790 | 5/1960 | Stedman et al. | 188/251 M |
| 3,703,224 | 11/1972 | Bray | 188/251 M |
| 3,948,364 | 4/1976 | Lowey | 188/251 R |
| 4,290,510 | 9/1981 | Warren | 188/218 XL |
| 4,311,524 | 1/1982 | Genkin et al. | 188/251 M |
| 4,438,004 | 3/1984 | Myers | 188/251 R |
| 4,565,744 | 1/1986 | Walter et al. | 428/570 |
| 4,815,572 | 3/1989 | Froberg et al. | 188/251 M |
| 4,839,238 | 6/1989 | Nakatani et al. | 428/614 |
| 5,005,676 | 4/1991 | Gassiat | 188/264 AA |
| 5,007,508 | 4/1991 | Lacombe | 188/251 A |
| 5,028,494 | 7/1991 | Tsujimura et al. | 428/614 |
| 5,103,942 | 4/1992 | Schmitt | 188/251 A |

FOREIGN PATENT DOCUMENTS

| | | | |
|---|---|---|---|
| 663012 | 5/1963 | Canada | 188/218 XL |
| 2194035 | 8/1987 | Japan | 192/107 M |
| 1052636 | 12/1966 | United Kingdom | 188/251 M |

*Primary Examiner*—Robert J. Oberleitner
*Assistant Examiner*—Chris Schwartz
*Attorney, Agent, or Firm*—Leo H. McCormick, Jr.; Larry J. Palguta

[57] ABSTRACT

A rotor for use with a caliper in a brake system of a vehicle. The rotor has a hub with a plurality of openings therein for attachment to an axle which rotates with a wheel of the vehicle. The hub has spokes which radially extend from the hub to an integral annular head member. The head member has parallel first and second friction surfaces thereon for engagement with brake pads on actuation during a brake application. The rotor which is made from a composition consisting essentially of from 50–85 percent by volume of silicon carbide and 50–15 percent by volume of copper and from 0–15 percent by volume of graphite fiber, develops a thermal conductivity at room temperature of from 0.16–0.74 cal/cm·sec·°C. (50–310 W/m·°K.).

8 Claims, 2 Drawing Sheets

ROTOR 12

| MATERIAL | DENSITY (Kg/m$^3$) x 10$^{-3}$ | | THERMAL CONDUCTIVITY cal/cm sec°C | | THERMAL DIFFUSION (M$^2$/sec.) x 10$^{-6}$ | | HEAT CAP (J/m$^3$-K) x 10$^{-6}$ | |
|---|---|---|---|---|---|---|---|---|
| | CALC | ACTUAL | CALC | ACTUAL | CALC | ACTUAL | CALC | ACTUAL |
| CAST IRON | | 7.2 | | .11 | | 15 | | 3.0 |
| AL MMC (20 SiC) | | 2.7 | | .39 | | 63 | | 2.6 |
| COPPER ALLOY | | 8.9 | | .77 | | 95 | | 3.4 |
| A Cu-60 Al$_2$O$_3$ | | 6.2 | | .68 | | 102 | | 2.8 |
| B Cu-70 SiC | 4.9 | 5.5 | .62 | .16 | 104 | 25 | 2.5 | 2.7 |
| C Cu-50 SiC | 6.1 | | .71 | | 106 | | 2.8 | |
| D Cu-85 SiC | 4.1 | | .55 | | 96 | | 2.4 | |
| E Cu-58 SiC + 12 Graphite Fiber | 4.8 | | .62 | | 104 | | 2.5 | |
| F Cu-58 Al$_2$O$_3$ + 12 Graphite Fiber | 5.2 | | .39 | | 53 | | 3.1 | |

ROTOR 12

| MATERIAL | DENSITY (Kg/m³) × 10⁻³ | | THERMAL CONDUCTIVITY cal/cm sec °C | | THERMAL DIFFUSION (M²/sec.) × 10⁻⁶ | | HEAT CAP (J/m³-K) × 10⁻⁶ | |
|---|---|---|---|---|---|---|---|---|
| | CALC | ACTUAL | CALC | ACTUAL | CALC | ACTUAL | CALC | ACTUAL |
| CAST IRON |  | 7.2 |  | .11 |  | 15 |  | 3.0 |
| AL MMC (20 SiC) |  | 2.7 |  | .39 |  | 63 |  | 2.6 |
| COPPER ALLOY |  | 8.9 |  | .77 |  | 95 |  | 3.4 |
| A Cu-60 Al₂O₃ |  | 6.2 |  | .68 |  | 102 |  | 2.8 |
| B Cu-70 SiC | 4.9 | 5.5 | .62 | .16 | 104 | 25 | 2.5 | 2.7 |
| C Cu-50 SiC | 6.1 |  | .71 |  | 106 |  | 2.8 |  |
| D Cu-85 SiC | 4.1 |  | .55 |  | 96 |  | 2.4 |  |
| E Cu-58 SiC + 12 Graphite Fiber | 4.8 |  | .62 |  | 104 |  | 2.5 |  |
| F Cu-58 Al₂O₃ + 12 Graphite Fiber | 5.2 |  | .39 |  | 53 |  | 3.1 |  |

FIG. 3

LIGHTWEIGHT AND HIGH THERMAL CONDUCTIVITY BRAKE ROTOR

This invention relates to a brake rotor made from composites of from 50–85 percent by volume of silicon carbide and from 50–15 percent by volume of copper. The copper in the composite imparts a high thermal conductivity characteristic to carry away thermal energy generated between first and second friction surfaces on the brake rotor and brake pads located in a caliper during a brake application.

In a effort to increase the overall fuel efficiency for a vehicle, the overall weight of vehicles have been decreasing for a period of time. One of the ways that the weight can be reduced is to replace a typical cast iron brake rotor with a brake rotor made from an aluminum or other light weight metal. Unfortunately, aluminum is not normally resistant to abrasion, and as a result, when aluminum is used, a wear resistant surface coating of the type disclosed in U.S. Pat. No. 4,290,510 must be applied to the friction engagement surfaces or a friction material retained in a backing plate is attached to a rotor such as disclosed in United Kingdom Patent No. 1,052,636 or as recently disclosed in U.S. Pat. No. 5,103,942 layers of friction material are attached to a rotor. This type of protection for aluminum rotors is adequate for most applications as long as the thermal energy generated during a brake application is below 482° C. (900° F.). However, in instances where the thermal energy generated approaches the melting point of aluminum, the structural rigidity decreases as the rotors actually soften and in some instances where the thermal energy exceeds the melting point of aluminum, the rotors can fail. Therefore, it was imperative to develop a rotor having the capability of conducting thermal energy away from a wear surface while maintaining good mechanical properties such as hardness and strength at high temperatures during a brake application.

A performance satisfactory rotor made from a copper chromium alloy has been developed which has exhibited a thermal conductivity of approximately seven times greater than cast iron. Unfortunately, the density of rotors made from copper chromium alloys would also be more than similar cast iron rotors and as a result an increase in the overall weight of a vehicle would not improve the desired fuel efficiency.

After evaluating many compositions, copper alloy-silicon carbide composites were developed for use as a brake rotor which has high thermal conductivity, a relative density of approximately three-fourths of cast iron and sustained structural strength at temperatures above 450° C. (842° F.). A particular family of such composites have been evaluated with from 50–15 percent by volume of copper and from 50–85 percent by volume of silicon carbide and under some circumstances from 0–15 percent by volume of graphite fiber have been added to modify the resulting mechanical properties. Typically, in the manufacture of such a rotor silicon carbide powder is packed into a mold and copper is infiltrated into the packed volume of silicon carbide powder as the temperature of the mold is raised to approximately 1200° C. (2192° F.) to form a unitary brake rotor. The brake rotor has a hub with a plurality of openings therein for attachment to an axle of a vehicle which rotates with a wheel and spokes or disc which radially extend from the hub to an annular head portion. The head portion has first and second friction surfaces thereon for engagement with brake pads during a brake actuation. The brake rotor has a density of 4.0 to 6.0 g/cm$^3$ and a resultant thermal conductivity at room temperature (20° C.=68° F.) of from 0.16–0.74 cal/cm-·sec·°C. (50–310 W/m.°K.).

It is an object of this invention to provide compositions of silicon carbide and copper or copper alloys for use in a brake rotor.

It is a further object of this invention to provide a high thermal conductivity and relative light weight composite composition for use in a brake rotor to withstand the generation of thermal energy during a brake application without degradation.

It is a still further object of this invention to provide a composite made from silicon carbide powder, graphite fiber and copper to produce a resulting brake rotor with a density of approximately seventy percent of a similar cast iron but with up to six times greater thermal conductivity of a cast iron rotor to maintain the effectiveness of a brake system over a wider range of operation.

These objects and advantages should be apparent from reading this application while viewing the drawings wherein:

FIG. 3 is a table illustrating physical characteristics of various compositions of the rotor of FIG. 1.

Figure 1:
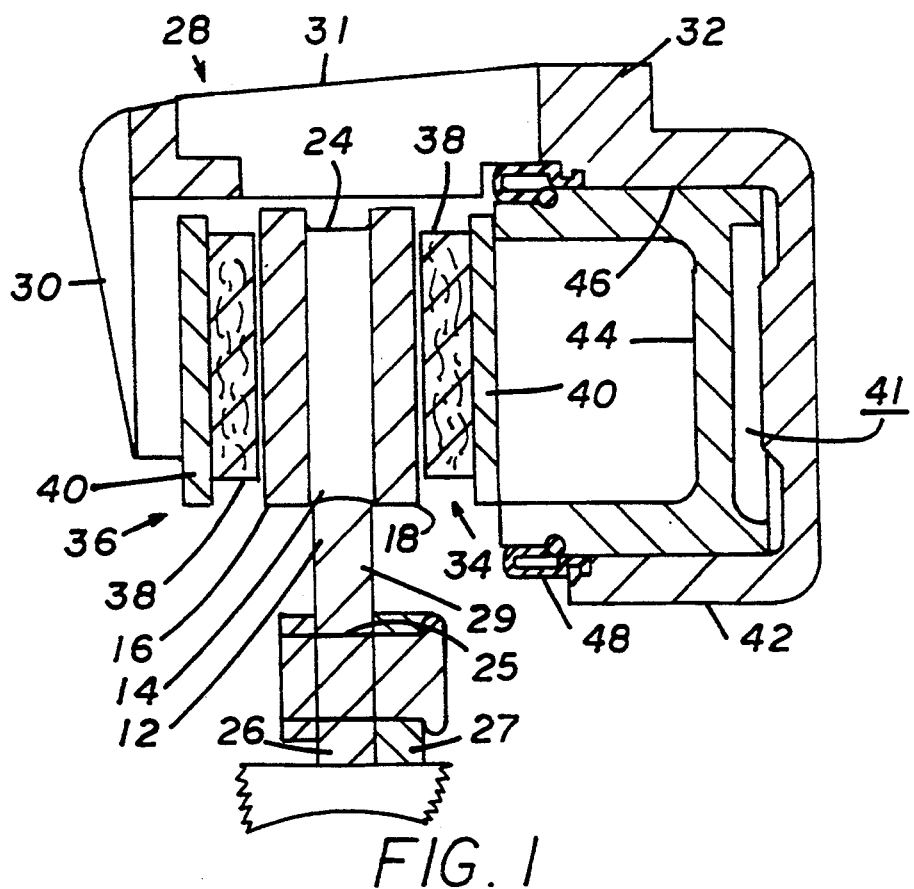
FIG. 1 is a schematic illustration of a brake system wherein a rotor made according to this invention is located between friction pads carried by a caliper.
Figure 2:
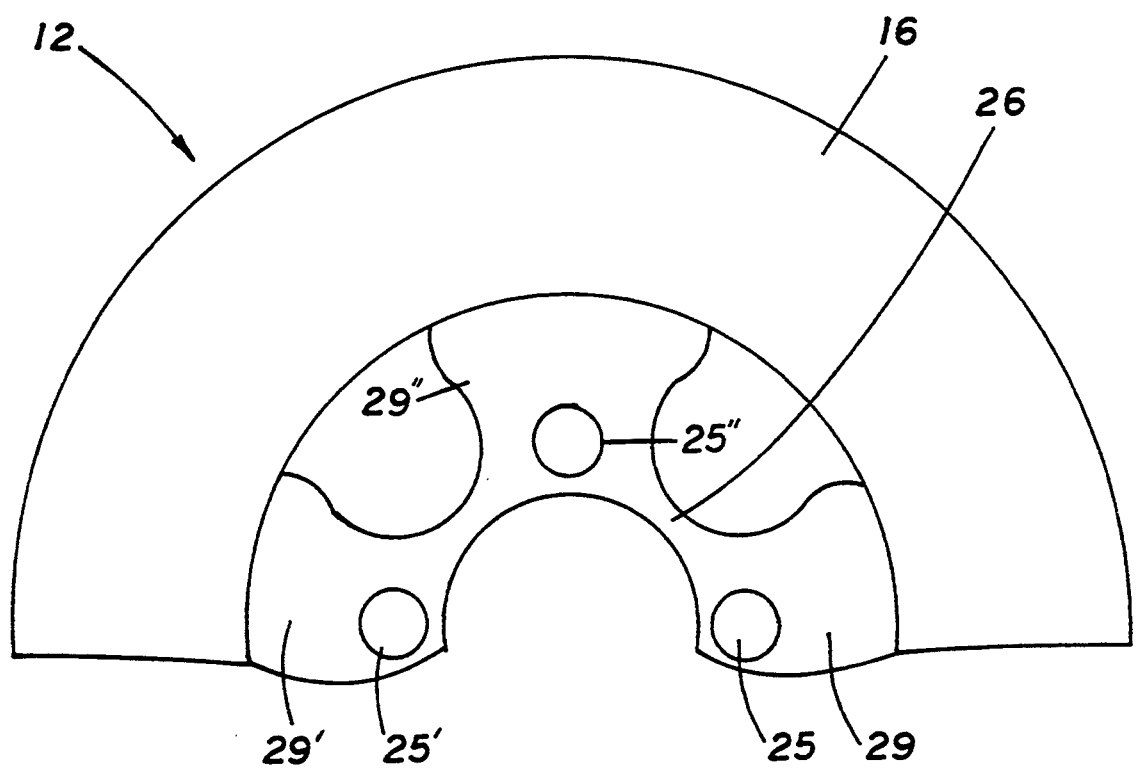
FIG. 2 is a side view of the rotor of FIG. 1.

FIG. 1 is an illustration of a section of a brake system which includes a caliper 28 which retains brake pads 34 and 36 for engagement with a rotor 12 made from a composite selected from a composition shown in FIG. 3 for use in a vehicle.

Rotor 12 has a hub 26 with a plurality of openings 25, 25' . . . 25$^n$ located therein for attachment to an axle 27 of a vehicle. The rotor 12 which rotates with a wheel, has spokes 29, 29' . . . 29$^n$ which radially extend from hub 26 to an integral annular head portion 14. The head portion 14 has a pair of friction faces 16 and 18 formed thereon which are separated from each other by a plurality of webs 24. The webs 24 hold the engaging faces 16 and 18 parallel while the spaces therebetween allows the flow of cooling air between the webs to promote cooling of the rotor 12. In addition, the voids between the spokes 29, 29' . . . 29$^n$ also allows a certain amount of air flow to also cool the rotor 12.

A caliper 28 which is located on the vehicle has a pair of legs 30 and 32 that are aligned in a spaced parallel relationship with faces 16 and 18 on rotor 12. Brake pads 34 and 36 which include a friction lining 38 and a backing plate 40, are positioned on caliper 28 to axially move in a direction generally perpendicular to the planar rotation of the rotor 12 in response to hydraulic fluid being supplied to chamber 41 of fluid motor 42.

The fluid motor 42 is carried by leg 32 of caliper 28 and inclues a piston 44 located in cylinder bore 46. A flexible boot or seal 48 had one end fixed to the caliper 28 and the other end fixed to piston 44 to seal chamber 41 and prevent dirt, water and other contaminants from entering bore 46.

During a brake application, hydraulic fluid is supplied to chamber 41 to move piston 44 and brake pad 34 toward face 18 on rotor 12 while at the same time leg 32 acts through web 31 and leg 30 to pull brake pad 36 toward face 16 on rotor 12. As the friction material 38 of brake pads 34 and 36 engage friction faces 16 and 18 thermal energy is generated. At temperatures below 204° C. (400° F.), the wear rate of the friction material is primarily controlled by the selection of friction modifiers in the friction material while at temperatures above 204° C. (400° F.) the wear rate increases exponentially with increasing temperature due to thermal degradation of the binder in the friction material. Thus, it is important that thermal energy generated during braking be conducted away from the friction material as quickly as possible.

Various materials from which brake rotors 12 may be manufactured and some of their particular physical and thermal characteristics are identified in FIG. 3.

A typical rotor 12 is made from gray cast iron and weighs about 12 pounds or approximately 5.5 Kg. At room temperature of 20° C. (68° F.), this type rotor could be expected to conduct 0.11 cal/cm·sec·°C. (46 W/m.°K.) of thermal energy away from the friction pads 34 and 36 at a rate of $15 \times 10^{-6} M^2$/sec. As long as the temperature generated during a brake application is below 871° C. (1600° F.) this type of rotor performs in a satisfactory manner. However, in order to reduce the overall weight of a vehicle, it has been suggested to replace the cast iron with aluminum such as aluminum metal matrix composite.

A typical rotor 12 made from an aluminum metal matrix composite (Al MMC) which includes 20 percent silicon carbide would have a weight of approximately 4.6 pounds or 2.1 Kg. The use of such aluminum composite provides a considerable reduction in weight for a rotor, a three and one-half increase in the conductivity of thermal energy and an approximate four fold rate of diffusion away from the friction material. As long as the thermal energy generated during a brake application is below 482° C. (900° F.), a rotor made from this type aluminum composite performs in a satisfactory manner. Unfortunately in meeting the current standard for braking, the thermal energy generated during a brake application may exceed 482° C. (900° F.) which can result in a degradation of the brake lining and braking surfaces on aluminum composite rotors. Thus, in order to continue to use brake rotors manufactured from such aluminum metal matrix composites, a need exists to increase the thermal capability of the brake rotor.

Because of the high thermal conductivity of cooper, a brake rotor 12 was made from a copper chromium alloy. Such a copper chromium alloy would provide a brake rotor with an increased rate of thermal conductivity and diffusion of approximately six times as compared with cast iron. Such chromium copper rotors performed satisfactory in vehicle tests, but unfortunately the weight of the rotor also increased to approximately 15.2 pounds or 6.9 Kg which would also increase the overall weight of a vehicle to an unacceptable level. In order to utilize the high conductive property of copper the following compositions identified in FIG. 3 as A, B, C, D and E were developed.

A composition A having about 60% by volume of aluminum oxide and 40% by volume of copper shown in FIG. 3 was evaluated as a material for the manufacture of a brake rotor 12. Such a rotor would have a weight of approximately 4.7 Kg (10.4 pounds) and a theoretical thermal conductivity and rate of thermal diffusion heat capacity, as shown in FIG. 3, which approximates that of the copper chromium alloy. While a rotor made from composition A would exhibit a 13 percent decrease in weight with respect to a cast iron rotor, it was known that silicon carbide has greater thermal conductivity than aluminum oxide and as result thereafter various copper silicon carbide compositions were evaluated.

A brake rotor 12 was made from composition B having about 70% by volume of silicon carbide and 30% by volume of copper. The resulting rotor had a measured weight of approximately 4.2 Kg (9.3 pounds) and a theoretical thermal conductivity and rate of thermal diffusion as illustrated in FIG. 3 which approximates that of the copper chromium alloy. However in actual tests, both the measured thermal conductivity and rate of thermal diffusion of composition B for brake rotor 12 were considerable less than anticipated. In conclusion, even though the thermal conductivity and rate of thermal diffusion of composition B was less that calculated, it was determined that composition B would be an acceptable substitute for cast iron since a 23 percent reduction in weight would be achieved with a 50 percent increase in thermal conductivity and 66 percent increase in thermal diffusion.

The theoretical thermal conductivity and rate of thermal diffusion for a brake rotor 12 made from compositions C and D are illustrated in FIG. 3. A rotor made from composition C, having about 50% by volume of silicon carbide and 50% by volume of copper, would have a weight of approximately 4.7 Kg (10.2 pounds). Such a rotor C would offer a 15 percent reduction in weight over a similar cast iron rotor. A rotor made from composition D, having about 85% by volume of silicon carbide and 15% by volume of copper, would have a weight of approximately 3.1 Kg (6.8 pounds). Such a rotor D would offer a 42 percent reduction in weight over a similar cast iron rotor. It is anticipated that the measured thermal conductivity and rate of thermal diffusion would be at least that of composition B.

In order to provide additional structural strength to a rotor it was suggested that graphite or carbon fibers could be added to a basic silicon carbide and copper composition to produce composition E shown in FIG. 3. A brake rotor 12 made from composition E, having about 58% by volume of silicon carbide 12% by volume of graphite fibers and 30% by volume of copper, would have a weight of approximately of 3.7 Kg (8.1 pounds) which would offer a 33% reduction over a similar cast iron rotor.

In order to evaluate the copper and graphite fiber based material it was suggested that aluminum oxide be substituted for silicon carbide to produce composition F shown in FIG. 3. A brake rotor 12 made from composition F, having about 58% by volume of aluminum oxide, 12% by volume of graphite fibers and 30% by volume of copper, would have a weight of approximately of 4.0 Kg (8.7 pounds) which would offer a 28% reduction over a similar cast iron rotor.

Only composition B has actually been used in the manufacture of a rotor 12 although it is anticipated that the other compositions could be used to manufacture a similar rotor. In this manufacturing process, silicon carbide powder was packed into a mold to obtain a desired density. Thereafter, the temperature of the mold was raised to approximately 1200° C. (2190° F.) and molten copper infiltrated therein to form a unitary brake rotor 12. The infiltration process for copper can take place whenever the temperature of the mold and metal is above the melting point of copper and is sufficient to cause the copper to flow and create an interconnected matrix within the packed volume of silicon carbide. While this temperature is below the melting point of silicon carbide, it has been found that a reaction takes place between the copper and silicon carbide powder resulting in the difference between the actual and theoretical thermal conductivity and rate of thermal diffusion for a brake rotor 12. The measured rate of thermal conductivity at room temperature 0.16 cal/cm·sec·°C. (67 W/m.°K.) for Composition B offers an improvement over similar cast iron and with changes in the composition or processing the theoretical rate of thermal conductivity of approximately 0.6 cal/cm·sec·°C. (251 W/m.°K.) should be achieved.

I claim:

1. A rotor for use with a caliper braking means comprising:
   a hub having a plurality of openings therein for attachment to an axle of a vehicle to rotate with a wheel;
   a disc extending radially from said hub; and
   an annular head portion extending from said disc, said head portion having first and second friction surfaces thereon for engagement with brake pads on actuation of said caliper to effect a brake application, said unitary rotor being made from a composition consisting essentially of from 50-70 percent by volume of silicon carbide, from 5-15 percent by volume of graphite and 40-15 percent by volume of copper, said composition having a theoretical thermal conductivity of 0.62 cal/cm·sec·°C. to produce a density of 4.8 g/cm$^{-3}$.

2. The rotor as recited in claim 1 wherein said copper forms a matrix for uniformly conducting thermal energy away from said first and second friction surfaces on engagement with said brake pads.

3. The rotor as recited in claim 2 wherein said thermal energy from said head is directly communicated into said disc for dissipation into the surrounding environment.

4. A rotor for use with a caliper braking means comprising:
   a hub having a plurality of opening therein for mounting relative to an axle of a vehicle, said hub rotating with a wheel on said vehicle;
   spokes extending radially from said hub; and
   an annular head portion extending from said spokes, said head portion having first and second friction surfaces thereon for engagement with brake pads on actuation of said caliper to effect a brake application, said engagement of said brake pads with said first and second friction surfaces generating thermal energy, said unitary rotor being made from a composition consisting essentially of from 50-85 percent by volume of silicon carbide and 50-15 percent by volume of copper, said composition having a thermal conductivity at room temperature to dissipate said thermal energy from said first and second surfaces at a rate greater than 0.16 cal/cm·sec·°C. while maintaining a substantially uniform structural strength above 800° C.

5. The rotor as recited in claim 4 wherein said composition comprises 70 percent by volume of silicon carbide and 30 volume percent of copper to produce a density of 4.9 g/cm$^3$.

6. The rotor as recited in claim 5 wherein said copper forms a matrix for uniformly conducting thermal energy away from said first and second friction surfaces on engagement with said brake pads.

7. The rotor as recited in claim 4 wherein said composition comprises 85 percent by volume of silicon carbide and 15 volume percent of copper to produce a density of 4.1 g/cm$^3$.

8. A rotor for use in a caliper braking means comprising:
   a hub having a plurality of openings therein for attachment to an axle of a vehicle, said hub rotating with a wheel on said vehicle;
   spokes extending radially from said hub; and
   an annular head portion extending from said spokes, said head portion having first and second friction surfaces thereon for engagement with brake pads on actuation of said caliper to effect a brake application, said engagement of said brake pads with said first and second friction surfaces generating thermal energy, said unitary rotor being made from a composition consisting essentially of from 50-85 percent by volume of alumina, from 5-15 percent by volume of graphite fiber and 50-15 percent by volume of copper, said composition having a density of from 5.2 g/cm$^{-3}$, a thermal conductivity at room temperature to dissipate said thermal energy from said first and second surfaces at a rate greater than 0.16 cal/cm·sec·° C. while maintaining a substantially uniform structural strength above 800° C.

* * * * *